United States Patent

Patent No.: 3060

The United States of America.

TO ALL TO WHOM THESE Letters Patent SHALL COME.

Whereas [illegible] [illegible] the United States, hath alleged that he has invented a new and useful improvement [illegible]

which improvement he states has not been known or used before his application; hath [illegible] that he does verily believe that he is the true inventor or discoverer of the said improvement; hath paid into the treasury of the United States the sum of thirty dollars, delivered a receipt for the same, and presented a petition to the Secretary of State, signifying a desire of obtaining an exclusive property in the said improvement, and praying that a patent may be granted for that purpose: These are therefore to grant, according to law, to the said [illegible] his heirs, administrators or assigns for the term of fourteen years, from the [illegible] day of [illegible] one thousand eight hundred and [illegible] the full and exclusive right and liberty of making, constructing, using and vending to others to be used, the said improvement, a description whereof is given in the words of the said [illegible] himself, in the schedule hereto annexed, and is made a part of these presents.

In Testimony whereof, I have caused these Letters to be made Patent, and the Seal of the United States to be hereunto affixed.

GIVEN under my hand, at the City of Washington, this [illegible] day of [illegible] in the year of our Lord one thousand eight hundred and [illegible] and of the independence of the United States of America the [illegible]

James Monroe

BY THE PRESIDENT.

[illegible]

Secretary of State.

City of Washington, To Wit:

I DO HEREBY CERTIFY, That the foregoing Letters Patent were delivered to me on the [illegible] day of [illegible] in the year of our Lord one thousand eight hundred and [illegible] to be examined; that I have examined the same, and find them conformable to law; and I do hereby return the same to the Secretary of State, within fifteen days from the date aforesaid, to wit, on this [illegible] day of [illegible] in the year aforesaid.

Attorney General of the United States.

United States Patent

Patent No.: 3060

United States Patent

Patent No.: 3060

United States Patent

Patent No.: 3060

United States Patent

Patent No.: 3060

United States Patent

Patent No.: 3060